United States Patent [19]

Friebe et al.

[11] Patent Number: 5,530,082
[45] Date of Patent: Jun. 25, 1996

[54] SINGLE-COMPONENT POLYSILOXANE COMPOUNDS

[75] Inventors: Robert Friebe; Wilhelm Weber; Karl-Heinz Sockel, all of Leverkusen, Germany

[73] Assignee: Bayer Aktiengesellschaft, Leverkusen, Germany

[21] Appl. No.: 298,733

[22] Filed: Aug. 31, 1994

Related U.S. Application Data

[63] Continuation-in-part of Ser. No. 295,308, Aug. 24, 1994, abandoned.

[30] Foreign Application Priority Data

Aug. 31, 1993 [DE] Germany .................. 43 29 263.1

[51] Int. Cl.⁶ .................................................. C08G 77/06
[52] U.S. Cl. ........................... 528/17; 524/730; 528/38
[58] Field of Search ........................ 524/730; 528/17, 528/38

[56] References Cited

U.S. PATENT DOCUMENTS 5,300,611  4/1994  Fujioka et al. ..................... 528/21

Primary Examiner—Melvyn I. Marquis
Attorney, Agent, or Firm—Sprung Horn Kramer & Woods

[57] ABSTRACT

Compounds of the general formula $$(R^3O)_{3-n}R^4{}_mSi-(CH_2)_z-X$$

wherein $R^3$, $R^4$ represent identical or different linear or branched $C_1$–$C_{20}$ alkyl groups or alkoxyalkyl groups, X represents a halogen atom, an aminoaryl group, wherein the aromatic group can optionally carry, on one or more carbon atoms at any position, $C_1$–$C_{20}$ alkyl groups or alkoxyalkyl groups, halogen atoms or other functional groups.

or a hydroxyl group or a $C_1$–$C_{20}$ alkoxyalkyl group, which is substituted at one or more carbon atoms at any position by one or more hydroxyl groups, n=0, 1 or 2 and z=an integer between 1 and 20 are suitable as adhesion promoters in 1K-RTV compounds which have titanium compounds as condensation catalysts.

12 Claims, No Drawings

SINGLE-COMPONENT POLYSILOXANE COMPOUNDS

This is a continuation-in-part of application Ser. No. 08/295,308, filed Aug. 24, 1994, now abandoned.

The invention relates to single-component silicone systems, hereinafter identified as 1K-RTV compositions, which can be stored with the exclusion of moisture and which cure at room temperature under the effect of moisture and thereby release alcohols as reaction products.

This type of composition can be prepared from polyorgano-siloxanes with reactive terminal groups, silane cross-linking agents and optional fillers by using condensation catalysts. According to the prior art, organic titanium compounds are suitable as catalysts. Polysiloxane compounds which contain titanium compounds as condensation catalysts are known. A few examples only are mentioned here as being representative of those which are prepared using this type of titanium catalyst and alkoxysilane cross-linking agents of the general formula $RSi(OR')_3$; U.S. Pat. No. 3,334,067, U.S. Pat. No. 3,294,739, DE-A U.S. Pat. No. 3,125,881, DE-A U.S. Pat. No. 3,512,337, U.S. Pat. No. 3,499,859 and U.S. Pat. No. 4,438,039.

A prerequisite for the successful use of these 1K-RTV compositions, e.g. as sealing compounds, is good and long-lasting adhesion to the substrate. Therefore the broadest possible adhesion spectrum is desirable for the compositions as this opens up a wide range of applications.

To improve the adhesive properties of 1K-RTV compounds, adhesion promoters are generally added to the pastes, there preferably being organo-functional silanes of the type $(R'O)_{3-n}R''_nSi$—X, wherein X represents any organic group, which is substituted in any position by a functional group such as, for example, an amino, cyano, mercapto, glycidyloxy or methacryloxy group.

There are numerous patents which describe the use of such compounds in alkoxy-hardening, titanium catalyzed polysiloxane compounds. For instance, DOS 2 063 630 described adhesives which contain carboxyl groups, such as, for instance, the compound $(CH_3O)_3Si(CH_2)_3S(CH_2)_2COOH$. U.S. Pat. No. 4,460,739, for instance, describes maleamidylpropyltriethoxy silane and GB Pat. No. 2 079 745A describes 1,3-bis-trimethoxy-silylpropyl-isocyanurate. GB Pat. No. 2 137 217A describes, inter alia, acyloxy, acryloxy, cyano, isocyanato, amino and epoxy functional alkoxysilanes as adhesion promoters. Mercaptosilanes are described in EP-A Pat. No. 345 645 and epoxyalkoxysilanes are described in EP-A Pat. No. 175 134. Combinations of functional silanes such as epoxysilanes and aminotrialkoxysilanes (EP-A Pat. No. 221 644) are also described.

These known adhesion promoters, however, have a number of disadvantages in practice. The adhesion promoting effect of silanes is sometimes restricted to only a few substrates and frequently, after storage of fully cured test bodies in water, a loss of adhesion is observed. Furthermore, cross-linking distortions and discoloration phenomena occur, especially in titanium catalyzed 1K RTV compositions, which are suspected to be due to reactions between the titanium catalysts and the adhesion promoters. Also, the non-cured compositions often have short shelf lives.

Therefore it is the object of the invention to find suitable adhesion promoters which avoid the disadvantages mentioned above and which produce good adhesion of 1K-RTV compounds.

Unexpectedly, it was found that particularly suitable adhesion promoters for the polysiloxane compositions according to the invention are organo-functional alkoxysilanes of the general formula $(R'O)_{3-n}R''_nSi$—$(CH_2)_z$—X, in which the functional group X is a halogen atom, especially chlorine, a hydroxyl group or an arylamino group, especially an aminophenyl group. Examples of such compounds are 3-chloro-propyltriethoxysilane, 3-chloropropyldimethoxymethylsilane, 3-hydroxypropyltriethoxysilane and 3-(N-phenylamino)-propyltriethoxysilane.

The 1K-RTV compositions produced with the aid of the adhesion promoters according to the invention have a surprisingly wide adhesion spectrum, the cured product has good mechanical properties, full curing takes place rapidly and without distortion, there is no tendency to discolor and the shelf lives are very long.

The invention provides a polyorganosiloxane composition, which cures at ambient temperature under the effect of water or moisture to give an elastomer, and which can be stored with the exclusion of water, prepared by mixing
 a) a polyorganosiloxane with reactive terminal groups and having a viscosity of 1.0 to 1000 Pa.s at 25° C.,
 b) optionally polyorganosiloxans with non-reactive terminal groups,
 c) a silane cross-linking agent of the formula $R^1_{4-n}Si(OR^2)_n$, wherein $R^1$ and $R^2$ each independently is a mono-valent optionally substituted hydrocarbon group with 2–8 carbon atoms and n is 2, 3 or 4,
 d) a titanium compound as a condensation catalyst,
 e) optionally a filler,
 f) an adhesion promoter of the formula $$(R^3O)_{3-n}R^4_nSi-(CH_2)_x-X$$

wherein
$R^3$ and $R^4$ each independently is a $C_1$–$C_{20}$ alkyl or alkoxyalkyl group,
X is a halogen atom,
an arylamino group optionally substituted on the aromatic moiety, or a hydroxyl group, or a $C_1$–$C_{20}$ alkoxyalkyl group which is substituted at one or more carbon atoms at any position by one or more hydroxyl groups.
n is 0, 1 or 2, and,
z is from 1 to 20,
and g) optionally other additives and auxiliary agents.

In the preferred embodiment of the present invention the polysiloxane composition which hardens at ambient temperature under the effect of water or moisture and which are obtainable by mixing
 a) 100 parts by wt. of polyorganosiloxanes with reactive terminal groups,
 b) 0 to 50 parts by wt. of polyorganosiloxanes with non-reactive terminal groups,
 c) 0 to 20, preferably 5 to 20 parts by wt. of alkoxysilane cross-linking agent,
 d) 0.01 to 2 parts by wt. of organic titanium compounds as condensation catalysts,
 e) 10 to 120 parts by wt. of fillers,
 f) adhesion promoters according to the invention, and
 g) optionally, other additives and auxiliary agents, such as, e.g. stabilizers, dyes and fungicides, in amounts of up to 5 parts by wt.

Polydimethylsiloxanes can be used as polydiorganosiloxanes with reactive terminal groups a), wherein the methyl groups can be partly replaced by vinyl, phenyl, $C_2$–$C_8$-alkyl or haloalkyl groups. The polydimethylsiloxanes should be essentially linear. Small proportions of branching organosiloxy units may, however, be present. The viscosity of the polymers is preferably between 1.0 and 1000 Pa.s, preferably less then 100 Pa.s. Suitable reactive terminal groups are trialkoxysiloxy or dialkoxyalkylsiloxy groups, wherein the alkyl group may optionally carry, at any position, halogen atoms or amino, aryl, alkyl or hydroxyl groups, or any other functional groups. In the latter case, diethoxymethylsiloxy, diethoxyvinylsiloxy, dimethoxymethylsiloxy, dimethoxy-3-chloropropylsiloxy ($-OSi(OCH_3)_2[(CH_2)_3Cl]$) or dimethoxy-3-(N-phenylaminopropyl)-siloxy ($-OSi(OCH_3)_2[(CH_2)_3NHPh]$) groups are preferred. In a preferred embodiment of the present invention the polyorganosiloxane a) preferably carries at least one of hydroxydimethyl, methyldimethoxy, vinyldiethoxy, triethoxysiloxy and 3-chloropropyl-dimethoxysiloxy terminal groups.

In another embodiment of the present invention wherein the polyorganosiloxane a) preferably carries at least one of hydroxydimethyl, methyldimethoxy, vinyldiethoxy, triethoxysiloxy and 3-chloropropyl dimethoxysiloxy terminal groups, the adhesion promoter is present in from about 0.01 to 10 wt. % with respect to the amount of polyorganosiloxane (a), and the alkoxysilane cross-linking agent c) comprises a partial hydrolyzate of methyltrimethoxysilane, vinyltriethoxysilane, methyltriethoxysilane or tetraethoxysilane, methyltriethoxysilane or tetraethoxysilane and the number of silicon atoms in the polyorganosiloxane a) and b) is from 2 to 12.

Suitable polyorganosiloxanes with non-reactive terminal groups are all silicone plasticizers known from the prior art. Polydimethylsiloxanes with trimethylsiloxy terminal groups and a viscosity of 0.1–5 Pa.s are preferably used as component b).

Alkoxysilanes are suitable as silane cross-linking agents c). Alkoxysilanes have the general formula $R^1_{4-n}Si(OR^2)_n$, wherein $R^1$ and $R^2$ each independently are a mono-valent optionally substituted hydrocarbon groups with 2–8 carbon atoms, and n is 2, 3 or 4. Preferred silane cross-linking agents are alkoxysilanes such as teraethoxysilane, methyltrimethoxysilane, methyltriethoxysilane or vinyltriethoxysilane or partial hydrolyzates of such alkoxysilanes.

Any conventional compounds which are partly known from the cited literature are used as organic titanium catalysts d), such as tetraalkyl titanates, e.g. $Ti(OC_2H_5)_4$, $Ti[OCH(CH_3)_2]_4$, $Ti[O(n-C_4H_9)]_4$, $Ti[OCH_2CH(CH_3)_2]_4$, $Ti[OCH_2CH(C_2H_5)-C_4H_9]_4$ and complexes of titanium with various chelating agents such as, e.g. β-dicarbonyl compounds such as ethyl acetoacetate or acetylacetone, ethyl diisobutyl-diacetoacetate titanate, diisopropyl-titaniumdiacetylaceto titanate, ethyl propane-1,2-dioxodiacetoacetate titanate, ethyl propane-1,3-dioxodiacetoacetate titanate or ethyl propane-1,2-dioxoacetoacetate-triethylcitrate titanate. Tetraisobutyl titanate, ethyl propane-1,2-dioxodiacetoacetate titanate, ethyl propane-1,2-dioxoacetoacetate-triethylcitrate titanate and ethyl diisobutyl-bis-acetoacetate titanate are particularly suitable.

Suitable fillers e) which can be used are reinforcing fillers such as pyrogenic or precipitated silicas and carbon black or weak or non-reinforcing mineral materials with a carbonate, silicate or oxide composition. The filler surface may be pretreated. Silanized pyrogenic silicas and milled natural chalk or precipitated chalk coated with stearic acid are particularly preferred.

The adhesion promoters f) according to the invention have the following general structure:

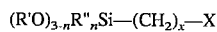

wherein

R',R" represent identical or different linear or branched $C_1$-$C_{20}$ alkyl groups or alkoxyalkyl groups, X represents a halogen atom, or an arylamino group, wherein the aromatic portion may optionally carry $C_1$-$C_{20}$ alkyl groups or alkoxyalkyl groups, halogen atoms or other functional groups on one or more carbon atoms at any position, or a hydroxyl group or a $C_1$-$C_{20}$ alkoxyalkyl group which is substituted, at one or more carbon atoms in any position, by one or more hydroxyl groups, n is 0, 1 or 2, and z is 1 to 20, particularly preferably 1 to 8, in particular 3.

3-Chloropropyltriethoxysilane, 3-chloropropyltrimethoxy-silane, 3-chloropropyldiethyoxymethyl silane, 2-chloroethyl-triethoxysilane, 3-(N-phenylamino) propyltri methoxysilane, 3-(N-(4-methylphenyl)-amino)-propyltriethoxysilane, 3-hydroxypropyltriethoxysilane and 3-(2-hydroxyethoxy)-propyltriethoxysilane are particularly suitable.

The adhesion promoters according to the invention are used in amounts of 0.01 to 10 wt. %, preferably 0.1 to 6 wt. %, with respect to the amount of polyorganosiloxane (compound a).

The composition according to the invention, as is usual with 1K-RTV compositions, may be prepared in planetary mixers, butterfly mixers, dissolvers, continuously operating mixing screws or other equipment suitable for preparing pastes. The compositions must be protected from atmospheric moisture during preparation and storage. Any sequence may be used for mixing the individual components.

The invention is explained in more detail by the following examples.

EXAMPLES 1 TO 7

55.0 parts by weight of a polydimethylsiloxane with $-OSi(OCH_3)_2(CH_3)$ terminal groups, which had a viscosity of 50 Pa.s at 25° C., were mixed with 29.0 parts by wt. of a polydimethylsiloxane with $-OSi(CH_3)_3$ terminal groups (viscosity 0.1 Pa.s at 25° C.) and 2.5 parts by wt. of methyltrimethoxysilane. Then 9.5 parts by wt. of a hydrophobic, pyrogenic silica were incorporated. Finally the titanium catalyst and the corresponding adhesion promoter were added (see Table 1).

To test the mechanical data, 2 mm thick sheets were applied to a smooth, plane base and tested after curing for 14 days at 25° C. and 50% relative humidity in accordance with DIN 53501 (standard test piece). In addition, the Shore A hardness of the cured elastomers were determined after 21 days in accordance with DIN 53505. The skin-forming time of the compounds is determined, i.e., the time which elapses until a skin forms on the surface of the sample layer. The adhesion is determined by applying the 1K-RTV compositions in the shape of a bead with the approximate dimensions 50×50×10 mm to test plates of various substrates and then, after curing time of 7 days, testing the adhesion to the corresponding substrate by means of a powerful tub on the cured material. After passing this test, the test specimen are stored for a further 7 days in water at room temperature and subjected to an adhesion test again.

EXAMPLE 8

55.0 parts by weight of a polydimethylsiloxane with $OSi(OCH_3)_2[(CH_2)_3Cl]$ terminal groups, which has a viscosity of 80 Pa.s at 25° C., were mixed with 29.0 parts by weight of a polydimethylsiloxane with —OSi(CH$_3$)$_3$ terminal groups (viscosity 1.0 Pa.s at 25° C.) and 2.5 parts by weight of methyltrimethoxysilane in a planetary mixer. Then 9.5 parts by weight of a hydrophobic, pyrogenic silica were incorporated. Finally, the titanium catalyst and adhesion promoter as cited in Table 1 were added.

EXAMPLES 9 TO 15

35.0 parts by weight of a polydimethylsiloxane with —OSi(CH$_3$)$_2$OH terminal groups, which had a viscosity of 80 Pa.s at 25° C. were mixed with 22.0 parts by weight of polydimethylsiloxane with —OSi(CH$_3$)$_3$ terminal groups (viscosity 0.01 Pa.s at 25° C.) and with 30.0 parts by weight of a chalk filler treated with stearic acid. Then the titanium catalyst (see Table 2) was incorporated. The batch was completed by incorporating 2.5 parts by weight of methyltrimethoxysilane and 5.5 parts by weight of a hydrophilic, pyrogenic silica and the amount of adhesion promoter given in Table 2.

TABLE 1

| Example No. | 1* | 2 | 3 | 4* | 5 | 6 | 7 | 8 |
|---|---|---|---|---|---|---|---|---|
| Ti catalyst | A | A | A | B | B | B | C | A |
| parts by weight | 1.0 | 1.0 | 1.0 | 0.9 | 0.9 | 0.9 | 1.0 | 1.0 |
| Adhesion promoter | — | D | E | | D | E | F | D |
| parts by weight | | 1.0 | 1.0 | | 1.0 | 1.0 | 0.3 | 0.5 |
| Skin-forming time (minutes) | 10 | 10 | 12 | 5 | 15 | 12 | — | 17 |
| Shore A hardness after 21 days DIN 53504 standard test piece | 19 | 21 | 20 | 16 | 19 | 18 | 20 | 19 |
| Tear strength (N/mm$^2$) | 1.56 | 1.60 | 1.78 | 1.75 | 1.70 | 1.68 | 1.50 | 1.77 |
| Elongation (%) | 541 | 482 | 598 | 586 | 536 | 521 | 520 | 643 |
| E modulus (N/mm$^2$) | 0.36 | 0.35 | 0.39 | 0.31 | 0.35 | 0.32 | 0.38 | 0.35 |
| Adhesion | | | | | | | 2 | 2 |
| Glass | 2 | 2 | 2 | 1 | 2 | 2 | 2 | 2 |
| Tiles | 2 | 2 | 2 | 1 | 2 | 2 | 2 | 2 |
| Aluminum | 0 | 2 | 2 | 0 | 2 | 2 | 2 | — |
| V$_4$A steel | — | — | — | — | — | — | 2 | 2 |
| Copper | 0 | 2 | 2 | 0 | 2 | 2 | 2 | 2 |
| PVC | 0 | 2 | 2 | 0 | 2 | 2 | 2 | 2 |
| Plexiglass | 1 | 2 | 2 | 0 | 2 | 2 | 2 | 2 |
| Macrolon | 0 | 2 | 2 | 1 | 2 | 2 | 2 | 2 |

*Comparison example
A = ethyl propane 1,2 dioxodiacetoacetate titanate
B = tetratsobutyl titanate
C = ethyl diisovutyl-bis-acetoacetate titanate
D = 3-chloropropyltriethoxysilane
E = 3-chloropropyltriethoxysilane
F = 3-(N-phenylamino)-propyltrimethoxysilane
Adhesion:
0 = no adhesion after curing for 7 days
1 = adhesion after curing for 7 days
2 = adhesion after curing for 7 days followed by 7 days in water at RT

TABLE 2

| Example No. | 9* | 10 | 11* | 12 | 13 | 14* | 15 |
|---|---|---|---|---|---|---|---|
| Ti catalyst | C | C | A | A | A | G | G |
| parts by weight | 1.0 | 1.0 | 1.0 | 1.0 | 1.0 | 1.5 | 1.5 |
| Adhesion promoter | — | F | — | D | C | — | D |
| parts by weight | | 0.5 | | 1.0 | 0.5 | | 1.0 |
| Sin-forming time minutes | — | — | 10 | 12 | 11 | 9 | 11 |
| Shore A hardness after 21 days DIN 53504 standard test piece | 27 | 29 | 28 | 30 | 28 | 27 | 29 |
| Tear strength (N/mm$^2$) | 1.43 | 1.46 | 1.50 | 1.49 | 1.51 | 1.39 | 1.43 |
| Elongation (%) | 424 | 450 | 463 | 475 | 465 | 421 | 420 |
| E-modulus (N/mm$^2$) | 0.46 | 0.45 | 0.45 | 0.44 | 0.43 | 0.46 | 0.45 |
| Adhesion/caterpillar track test | | | | | | | |
| Glass | 2 | 2 | 2 | 2 | 2 | 2 | 2 |

TABLE 2-continued

| Example No. | 9* | 10 | 11* | 12 | 13 | 14* | 15 |
|---|---|---|---|---|---|---|---|
| Tiles | 2 | 2 | 2 | 2 | 2 | 2 | 2 |
| Aluminum | 2 | 2 | 1 | 2 | 2 | 1 | 2 |
| $V_4A$ steel | 2 | 2 | 0 | 2 | 1 | — | — |
| Copper | 0 | 2 | 1 | 2 | 2 | 0 | 2 |
| PVC | 0 | 2 | 0 | 2 | 2 | 0 | 2 |
| Plexiglass | 0 | 2 | 0 | 2 | 2 | 0 | 2 |
| Macrolon | 0 | 2 | 1 | 2 | 2 | 0 | 2 |

*Comparison example
A = ethyl propane-1,2-dioxodiacetoacetate titanate
C = ethyl diisobutyl-bis-acetoacetate titanate
D = 3,-chloropropyltriethoxysilane
F = 3-(N-phenylamino)-propyltrimethoxysilane
G = ethyl propane-1,2-dioxo-acetoacetate-triethyl-citrate titanate
Adhesion:
0 = no adhesion after curing for 7 days
1 = adhesion after curing for 7 days
2 = adhesion after curing for 7 days followed by 7 days in water at RT It is understood that the specification and examples are illustrative but not limitative of the present invention and that other embodiments within the spirit and scope of the invention will suggest themselves to those skilled in the art.

We claim:

1. A polyorganosiloxane composition, which cures at ambient temperature under the effect of water or moisture to give an elastomer, and which can be stored with the exclusion of water, prepared by mixing a) a polyorganosiloxane with reactive terminal groups and having a viscosity of 1.0 to 1000 Pa.s at 25° C., b) optionally polyorganosiloxanes with non-reactive terminal groups, c) a silane cross-linking agent of the formula $R'_{4-n}Si(OR^2)_n$, wherein $R^1$ and $R^2$ each independently is a mono-valent hydrocarbon group with 2–8 carbon atoms and n is 2, 3 or 4, or a partial hydrolyzate of such silane, d) an organic titanium compound as a condensation catalyst, e) optionally a filler, f) an adhesion promoter of the formula

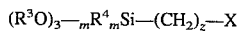
   $(R^3O)_{3-m}R^4_mSi-(CH_2)_z-X$ wherein $R^3$ and $R^4$ each independently is a $C_1$–$C_{20}$ alkyl or alkoxyalkyl group, X is a halogen atom,
   an arylamino group,
   or a hydroxyl group, or a $C_1$–$C_{20}$ alkoxy alkyl group which is substituted at one or more carbon atoms at any position by one or more hydroxyl groups, m is 0, 1 or 2, and z is from 1 to 20, and g) optionally other additives and auxiliary agents.

2. A composition according to claim 1, wherein the adhesion promoter f) is selected from the group consisting of 3-chloropropyltriethoxysilane and 3-chloropropyl-trimethoxysilane.

3. A composition according to claim 1, wherein the adhesion promoter f) is selected from the group consisting of 3-(N-phenylamino)-propyltrimethoxysilane and 3-(N-(4-methylphenyl)-amino)-propyltriethoxysilane.

4. A composition according to claim 1, wherein the promoter f) comprises 3-hydroxypropyltrimethoxysilane.

5. A composition according to claim 1, wherein the adhesion promoter is present in from about 0.01 to 10 wt. % with respect to the amount of polyorganosiloxane (a).

6. A composition according to claim 1, wherein the silane cross-linking agent c) is selected from the group consisting of methyltrimethoxysilane, vinyltriethoxysilane, methyltriethoxysilane and tetraethoxysilane.

7. A composition according to claim 1, wherein the silane cross-linking agent c) comprises a partial hydrolyzate of methyltrimethoxysilane, vinyltriethoxysilane, methyltriethoxysilane or tetraethoxysilane, and the number of silicon atoms in the polyorganosiloxane a) and b) is from 2 to 12.

8. A composition according to claim 1, wherein the polyorganosiloxane a) contains hydroxydimethyl, methyldimethoxy, vinyldiethoxy, triethoxysiloxy or 3-chloropropyl-dimethoxysiloxy terminal groups.

9. A composition according to claim 4, wherein the polyorganosiloxane a) contains hydroxydimethyl, methyldimethoxy, vinyldiethoxy, triethoxysiloxy or 3-chloropropyl-dimethoxysiloxy terminal groups, the adhesion promoter is present in from about 0.01 to 10 wt. % with respect to the amount of polyorganosiloxane (a), and the alkoxysilane cross-linking agent c) comprises a partial hydrolyzate of methyltrimethoxysilane, vinyltriethoxysilane, methyltriethoxysilane or tetraethoxysilane, methyltriethoxysilane or tetraethoxysilane and the number of silicon atoms in the polyorganosiloxane a) and b) is from 2 to 12.

10. In a single-component silicone composition comprising a silicone, an organic titanium compound and an adhesion promoter, the improvement wherein such adhesion promoter comprises a compound of the formula

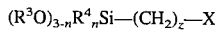
$(R^3O)_{3-n}R^4_nSi-(CH_2)_z-X$ wherein $R^3$ and $R^4$ each independently is a $C_1$–$C_{20}$ alkyl or alkoxyalkyl group, X is a halogen atom,
or a hydroxyl group, or a $C_1$ $C_{20}$ alkoxyalkyl group which is substituted at one or more carbon atoms at any position by one or more hydroxyl groups, n is 0, 1 or 2, and z is an integer from 1 to 20.

11. In a single-component silicone composition comprising a silicone, an organic titanium compound and an adhesion promoter, the improvement wherein such adhesion promoter comprises a compound of the formula $(R^3O)_{3-m}R^4_mSi-(CH_2)_z-X$ wherein $R^3$ and $R^4$ each independently is a $C_1$–$C_{20}$ alkyl or alkoxyalkyl group, n is 2 or 3, z is from 1 to 20, and X is an arylamino group.

12. A composition according to claims 11, wherein X is phenylamino.

* * * * *

UNITED STATES PATENT AND TRADEMARK OFFICE
CERTIFICATE OF CORRECTION

PATENT NO. : 5,530,082
DATED : June 25, 1996
INVENTOR(S) : Friebe, et al.

It is certified that error appears in the above-indentified patent and that said Letters Patent is hereby corrected as shown below:

Title Page     ABSTRACT: Line 2 delete " $(R^3O)_{3-n}R^4_mSi-(CH_2)_z-X$ " and substitute -- $(R^3O)_{3-n}R^4_nSi-(CH_2)_z-X$ --

Col. 7, line 44    Delete " $(R^3O)_{3-m}R^4_mSi-(CH_2)_z-X$ " and substitute -- $(R^3O)_{3-n}R^4_nSi-(CH_2)_z-X$ --

Col. 7, line 52    After " $C_1-C_{20}$ " delete " alkoxy alkyl " and substitute -- alkoxyalkyl --

Col. 7, line 55    Delete " m " and substitute -- n --

Col. 9, line 1     Delete " $(R^3O)_{3-m}R^4_mSi-(CH_2)_z-X$ and substitute -- $(R^3O)_{3-n}R^4_nSi-(CH_2)_z-X$ --

Signed and Sealed this

Third Day of June, 1997

Attest:

BRUCE LEHMAN

Attesting Officer     Commissioner of Patents and Trademarks